(12) United States Patent
Gibbs et al.

(10) Patent No.: US 8,130,633 B2
(45) Date of Patent: Mar. 6, 2012

(54) METHOD FOR TRANSFERRING DATA IN A WIRELESS NETWORK

(75) Inventors: Fraser Gibbs, Waterloo (CA); Charles Wang, Waterloo (CA)

(73) Assignee: Research In Motion Limited, Waterloo (CA)

( * ) Notice: Subject to any disclaimer, the term of this patent is extended or adjusted under 35 U.S.C. 154(b) by 902 days.

(21) Appl. No.: 10/971,770

(22) Filed: Oct. 22, 2004

(65) Prior Publication Data

US 2006/0088009 A1 Apr. 27, 2006

(51) Int. Cl.
*G01R 31/08* (2006.01)
(52) U.S. Cl. ......... 370/216; 370/230; 370/310; 370/469
(58) Field of Classification Search .................. 370/216, 370/230, 310, 389, 428, 338, 469
See application file for complete search history.

(56) References Cited

U.S. PATENT DOCUMENTS

| | | | | |
|---|---|---|---|---|
| 4,679,189 A * | 7/1987 | Olson et al. | ............. | 370/396 |
| 4,775,974 A * | 10/1988 | Kobayashi | ............. | 370/231 |
| 5,481,735 A * | 1/1996 | Mortensen et al. | ............. | 709/246 |
| 6,718,500 B1 * | 4/2004 | Lee et al. | ............. | 714/749 |
| 6,930,980 B2 * | 8/2005 | Tourunen et al. | ............. | 370/236 |
| 7,233,573 B2 * | 6/2007 | Walls et al. | ............. | 370/236 |
| 7,251,227 B2 * | 7/2007 | de Jong et al. | ............. | 370/331 |
| 7,733,782 B2 * | 6/2010 | Sunnell et al. | ............. | 370/236 |
| 2001/0036154 A1 * | 11/2001 | Takagi | ............. | 370/229 |
| 2003/0120802 A1 * | 6/2003 | Kohno | ............. | 709/237 |
| 2003/0185216 A1 * | 10/2003 | Wende et al. | ............. | 370/395.5 |

(Continued)

FOREIGN PATENT DOCUMENTS

| | | |
|---|---|---|
| EP | 1 422 882 | 5/2004 |
| WO | WO 01/78286 | 10/2001 |
| WO | WO 2004/021620 | 3/2004 |

OTHER PUBLICATIONS

3GPP: 3rd Generation Partnership Project; Technical Specification Group Core Network; Mobile Station (MS)—Serving GPRS Support Node (SGSN); Subsnetwork Depedent Donvergence Protocol (SNDCP)(Rel. 6) 3GPP TS44.065 V6.3.0 (online), Sep. 2004; pp. 1-50, retrieved from the Internet: URL:http://www.3gpp.org/ftp/Specs/archive/44_series/44.065/>.

(Continued)

*Primary Examiner* — Kwang B Yao
*Assistant Examiner* — Nguyen Ngo

(57) ABSTRACT

The invention is directed to a process for transferring data packets through a protocol stack employed by the device for transmitting packets on a packet connection to a wireless network, said wireless network operating at least two, distinct wireless access technologies such as GSM/GPRS and UMTS. The packet transfer process generally comprises each layer of a protocol stack for a currently active packet connection path providing confirmation to a next, higher layer in the stack of successful reception of a data packet from that layer, thereby confirming successful transfer of the data packet through the stack. The first layer of the stack stores a copy of a transferred packet until such time as its receives confirmation from the next, lower layer of successful transfer of the packet of the stack. In the absence of such confirmation and on the occurrence of a switch (hand-off) of the packet connection to a new connection path, particularly one of a different wireless access technology, the stored packet is transferred to the protocol stack to be employed by the wireless device for the new packet connection path. Consequently, the packet transfer process avoids packets being lost on the occurrence of a switch between different technology wireless access packet connection paths.

18 Claims, 4 Drawing Sheets

U.S. PATENT DOCUMENTS

| | | | |
|---|---|---|---|
| 2003/0218995 A1* | 11/2003 | Kim et al. | 370/318 |
| 2004/0228282 A1* | 11/2004 | Bao et al. | 370/252 |
| 2004/0264488 A1* | 12/2004 | Yoon et al. | 370/412 |
| 2005/0038895 A1* | 2/2005 | Mohamed et al. | 709/230 |
| 2005/0175033 A1* | 8/2005 | Funnell et al. | 370/469 |
| 2005/0190693 A1* | 9/2005 | Jinzaki et al. | 370/229 |
| 2005/0239453 A1* | 10/2005 | Vikberg et al. | 455/426.1 |
| 2006/0009159 A1* | 1/2006 | Leung | 455/67.11 |
| 2007/0058669 A1* | 3/2007 | Hoffmann et al. | 370/466 |
| 2007/0147296 A1* | 6/2007 | Barbaresi et al. | 370/331 |

OTHER PUBLICATIONS

Digital cellular telecommunications systems (Phase 2+); Mobile Station Serving GPRS Support Node (MS-SGSN) Logical Link Control (LLC) Layer Specification (3GPP TS 44.064 version 5.1.0 Release 5); ETSI TS 144 064; ETSI Standards, European Telecomm. Stds Inst. v. 3-CN1, No. V510, Mar. 2002.

* cited by examiner

METHOD FOR TRANSFERRING DATA IN A WIRELESS NETWORK

FIELD OF THE INVENTION

The present invention concerns a method for transferring data in a wireless network and particularly to a method for transferring data by a mobile device capable of being operated in accordance with at least two wireless access technologies of said wireless network.

BACKGROUND TO THE INVENTION

Mobile wireless communications systems have developed from first generation analogue based mobile wireless systems to second generation digital systems such as the Global System for Mobile Communications (GSM). Now, the so-called third generation mobile communications system is being evolved. This is a next generation global mobile communications system that is generally based on the core network technology of GSM but employing a distinct wireless access technology. Various telecommunications standards bodies and telecommunications equipment vendors from around the world have agreed to collaborate on what is known as the Third Generation Partnership Project (3GPP). The 3GPP encompasses a number of research fields relating to development of the Universal Mobile Telecommunications System (UMTS). UMTS is the European form of the third generation mobile communications system.

GSM was developed as a voice based mobile wireless communications technology. Some years ago it was enhanced by the addition of a data technology known as General Packet Radio Service (GPRS) which enables GSM mobile devices (handsets) to send and receive packet based messages.

UMTS is a new wireless access technology that is quite different and thus generally incompatible with GSM/GPRS but which affords considerably higher data rates than GPRS. However, because of the high capital costs of installing a replacement UMTS system, such systems are gradually being deployed in co-existence with the already installed GSM systems. As such, for some time to come, mobile wireless communications systems will consist of both GSM/GPRS and UMTS services with many areas supporting only GSM/GPRS. Consequently, it is necessary that mobile devices support both technologies and be able to switch between these in either direction. Only one of the technologies is active at any time for a connection although handover between technologies for a currently active connection is enabled.

The 3GPP specifications for GPRS/UMTS describe how data packets should be transferred on each technology and when a switch between technologies should occur for a packet data (i.e. packet switched) connection. In most modes of operation, the specifications describe data being transferred through the Internet Protocol (IP) layer of the protocol stack of the active technology path with no simple process for determining whether data transmission through the stack is successful. If a data packet does not get transmitted by a lower layer of the active protocol stack, which occurs frequently due to poor radio conditions, for example, and, if a technology switch is then effected, such data packet may be lost in the initially active data path. This is particularly egregious for delay sensitive packet data connections such as conversational class real time services, e.g. video telephony.

The 3GPP specifications do describe for GPRS and UMTS a number of modes of operation comprising one or more of a "transparent mode", an "unacknowledged mode" and an "acknowledged mode". The acknowledged mode of operation does involve a packet transmission acknowledgement process. However, the described process involves latency issues for delay sensitive services and thus is a rarely employed mode of operation.

OBJECT OF THE INVENTION

It is an object of the invention to mitigate and/or obviate problems associated with the transmission of data packets within mobile devices in the existing GPRS and UMTS technologies as currently specified in the 3GPP specifications.

It is a further object of the invention to provide a method for acknowledging packet transmission within the protocol stack of the currently active data path for at least the unacknowledged mode of operation of a GPRS/UMTS mobile device.

SUMMARY OF THE INVENTION

In a first main aspect, the present invention provides a method of transferring data packets in a wireless device capable of being operated in accordance with two wireless access technologies of a wireless network, comprising the steps of: transferring a data packet from a first layer of a protocol stack employed by the device for a packet connection with the network to a second, lower layer of said stack; and receiving at said first layer an indication from said lower layer of receipt of said data packet thereby confirming successful transfer of the data packet by the first layer to the second layer.

In a second main aspect, the present invention provides a wireless device for transferring data packets over a packet connection with a wireless network, said device being operable in accordance with two wireless access technologies of the wireless network, comprising: means for transferring a data packet from a first layer of a protocol stack employed by the device for a packet connection with the network to a second, lower layer of said stack; and means for receiving at said first layer an indication from said lower layer of receipt of said data packet thereby confirming successful transfer of the data packet by the first layer to the second layer.

In a third main aspect, the present invention provides a computer readable storage medium containing code means for the device of the second main aspect of the invention for carrying out the steps of the method of the first main aspect of the invention.

In a fourth main aspect, the present invention provides a system comprising an electronic device for transferring packets on a packet connection through a wireless network, said wireless network including two wireless access networks of different technologies, wherein said device comprises the device of the second main aspect of the invention.

Further aspects and features of the present invention will be apparent from the appended claims.

BRIEF DESCRIPTION OF THE DRAWINGS

A description of the present invention will follow with reference to the accompanying drawings, of which.

DETAILED DESCRIPTION OF A PREFERRED EMBODIMENT

The foregoing and further features of the present invention will be more readily understood from a description of a preferred embodiment, by way of example thereof, with reference to the accompanying drawings.

Figure 1:
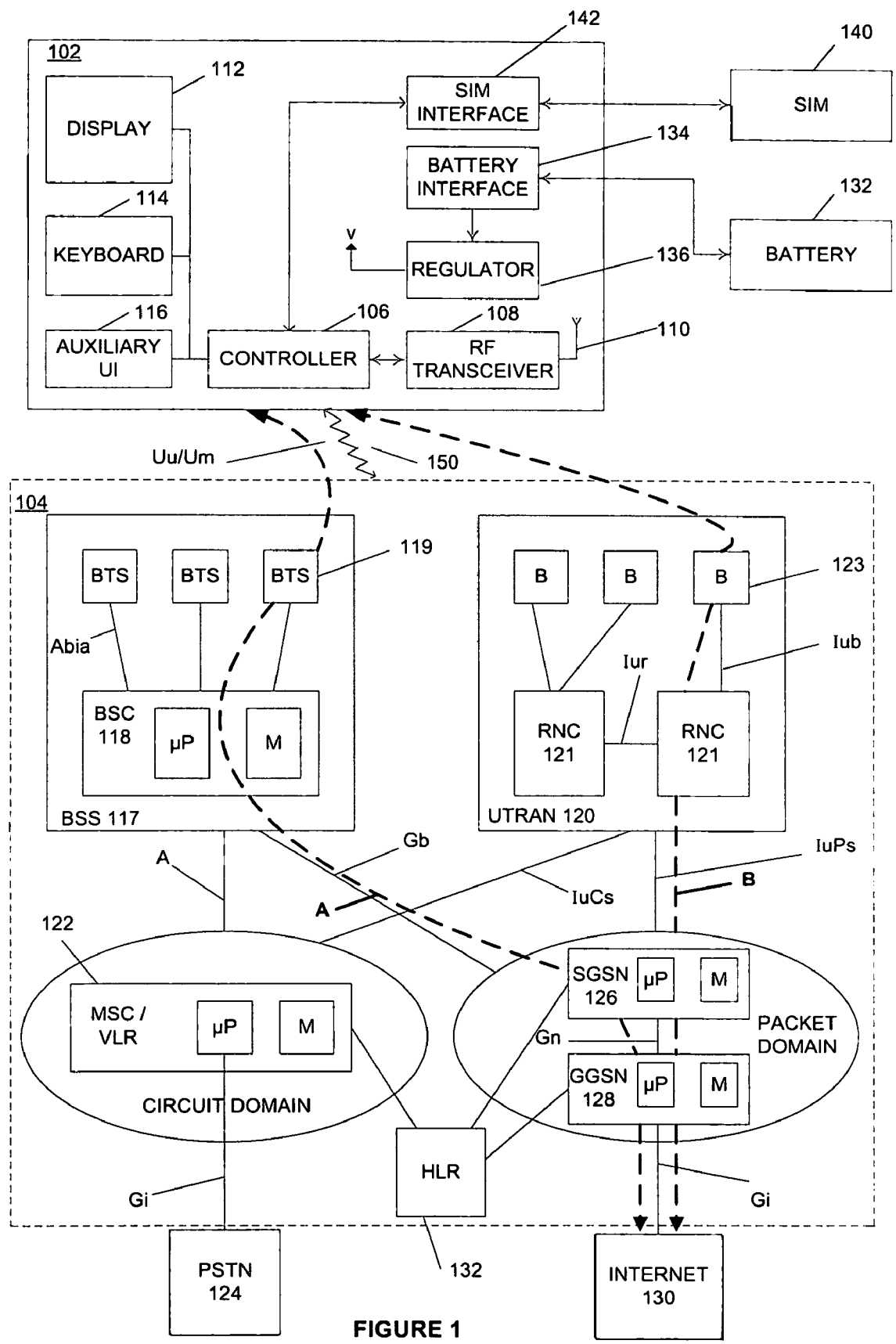
FIG. 1 is a block diagram which illustrates components of a mobile device capable of being operated in accordance with GSM and UMTS access technologies of a wireless access communication network and the network within which the mobile device operates.

FIG. 1 is a block diagram of a communication system 100, which includes a mobile device 102 that communicates through a wireless communication network 104. Mobile device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU), which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link 150 via antenna 110. RF transceiver circuitry 108 performs functions such as modulation/demodulation and possibly encoding/decoding and encryption/decryption. It will be apparent to those skilled in art that RF transceiver circuitry 108 will be adapted to particular wireless network or networks in which mobile device 102 is intended to operate.

Mobile device 102 includes a battery interface 134 for receiving one or more rechargeable batteries 132. Battery 132 provides electrical power to electrical circuitry in mobile device 102, and battery interface 132 provides for a mechanical and electrical connection for battery 132. Battery interface 132 is coupled to a regulator 136, which regulates power to the device. When mobile device 102 is fully operational, an RF transmitter of RF transceiver circuitry 108 is typically keyed or turned on only when it is sending to a network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 operates using a Subscriber Identity Module (SIM) 140 which is connected to or inserted in mobile device 102 at a SIM interface 142. SIM 140 is one type of a conventional "smart card" used to identify an end user (or subscriber) of mobile device 102 and to personalize the device, among other things. Without SIM 140, the mobile device terminal is not fully operational for communication through wireless network 104. By inserting SIM 140 into mobile device 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile device. SIM 140 may store additional user information for the mobile device as well, including datebook (or calendar) information and recent call information.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. In the embodiment of FIG. 1, wireless network 104 is configured as a dual mode wireless access network in accordance with both of the Global Systems for Mobile (GSM) Communications/General Packet Radio Service (GPRS) and Universal Mobile Telecommunications System technologies. Dual mode wireless network 104 includes a GSM base station subsystem (BSS) 117 and a UMTS Terrestrial Radio Access Network (UTRAN) 120 as separate wireless access networks for the mobile device 102, a Mobile Switching Center (MSC) 122 (which may include a Visitor Location Register for roaming mobile devices), a Home Location Register (HLR) 132, a Serving General Packet Radio Service (GPRS) Support Node (SGSN) 126, and a Gateway GPRS Support Node (GGSN) 128. MSC 122 is coupled to both of the BSS 117 and UTRAN 120 and to a landline network, such as a Public Switched Telephone Network (PSTN) 124. SGSN 126 is coupled to both BSS 117 and UTRAN 120 and to GGSN 128, which is in turn coupled to a public or private data network 130 (such as the Internet). HLR 132 is coupled to MSC 122, SGSN 126, and GGSN 128.

BSS 117 comprises at least one Base Station Controller (BSC) 118 which serves a plurality of Base Transceiver Stations (BTSs) 119 as will be familiar to the skilled artisan. UTRAN 120 comprises a number of Radio Network Controllers (RNCs) 121 which each serve respective Node Bs 123, again in a manner familiar to the skilled artisan. It will be understood that in UMTS parlance mobile devices 102 are referred to as User Equipments (UEs), but, for convenience, such devices will continue to be referred to as mobile devices in the following description. Also shown in FIG. 1 are the designations of the interfaces between the various components of the wireless access network 104 using the recognized designations from the GPRS and UMTS specifications.

The fixed BTSs 119 provide wireless network coverage for respective coverage areas commonly referred to as "cells". Each BTS 119 transmits communication signals to and receives communication signals from mobile devices 102 within its cell. Each BTS 119 normally performs such functions as modulation and possibly encoding and/or encryption of signals to be transmitted to the mobile devices 102 in accordance GSM/GPRS protocols and parameters, under control of its respective BSC 118. Each BTS 119 similarly demodulates and possibly decodes and decrypts, if necessary, any communication signals received from mobile devices 102 within its cell.

Node Bs 123 of UTRAN 120 similarly provide wireless network coverage for mobile devices (102) within their respective cells under control of their respective RNCs 121 in accordance with UMTS protocols and parameters.

The wireless link 150 of FIG. 1 represents one or more different channels, typically different radio frequency (RF) channels for GSM/GPRS and radio bearer or logical channels for UMTS, between mobile devices 102 and the BSS 117 and UTRAN 120. Those skilled in art will appreciate that a dual mode wireless network 104 in actual practice may include hundreds of cells, each served by a BTS 119 and/or Node B 123, depending upon desired overall expanse of network coverage. All pertinent components may be connected by multiple switches and routers (not shown), controlled by multiple network controllers.

For all mobile devices 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. The VLR of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM and UMTS as appropriate. In conventional operation, cell selection may be performed autonomously by mobile device 102 or by the BSC 118 and/or the RNC 121 responsible for the device 102 instructing it to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming data, or SMS messages over GPRS. In order to send and receive data, mobile device 102 assists in activating the packet data address that it wants to use. This operation makes mobile device 102 known to GGSN 128 such that interworking with external data networks can thereafter commence. User data may be transferred transparently between mobile device 102 and the external data networks using, for example, encapsulation and tunneling. Data packets are equipped with GPRS-specific protocol information and transferred between mobile device 102 and GGSN 128 via either the BSS 117 or UTRAN 120.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
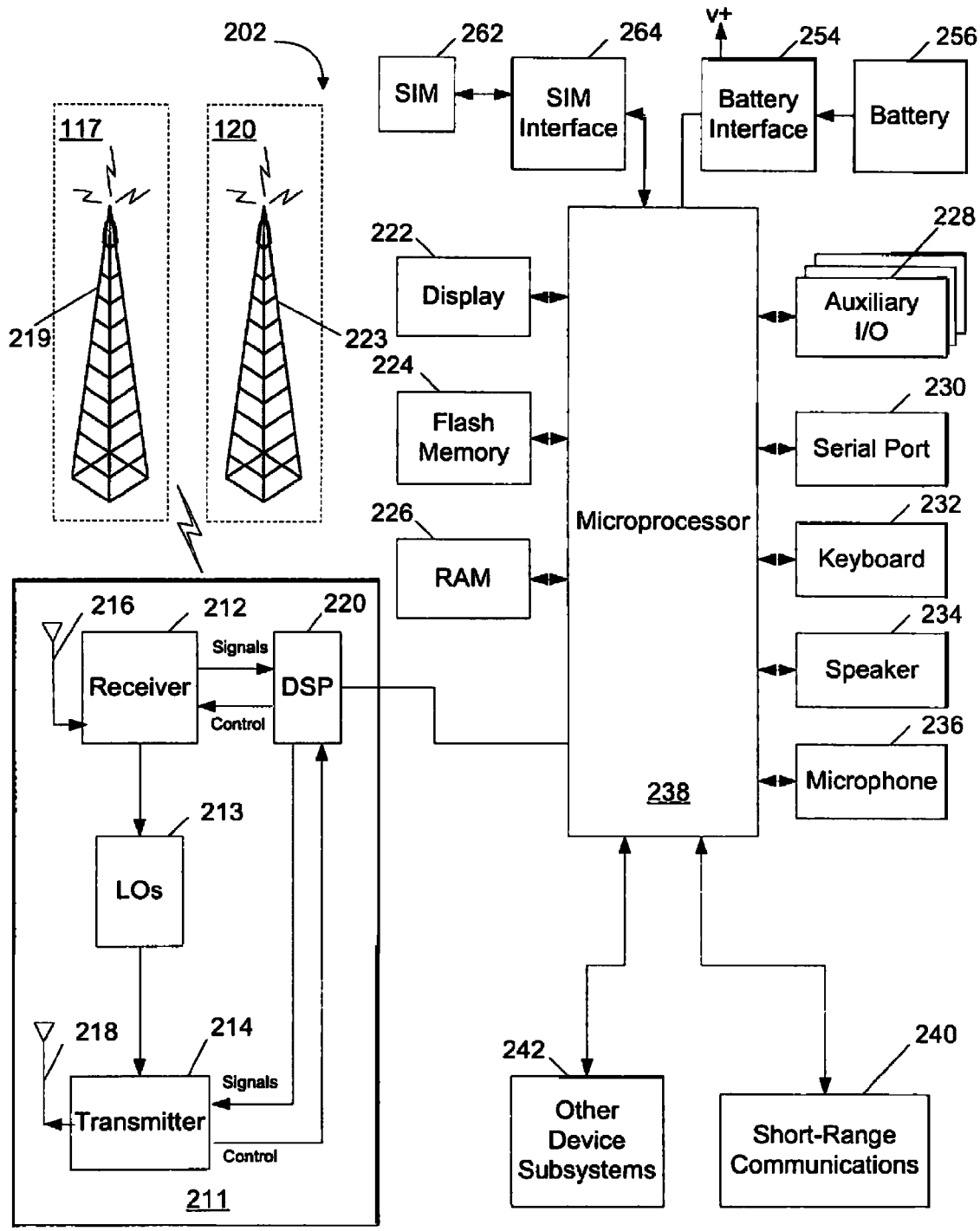
FIG. 2 is a schematic diagram illustrating in greater detail components of the mobile device of FIG. 1.

FIG. 2 is a detailed block diagram of a mobile device 202 (e.g. mobile device 102 of FIG. 1). Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of BTSs 219 and/or Node Bs 223 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and the like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 requires a Subscriber Identity Module or "SIM" card 262 to be inserted in a SIM interface 264 in order to operate in the network. SIM 262 includes those features described in relation to FIG. 1. Mobile device 202 is a battery-powered device so it also includes a battery interface 254 for receiving one or more rechargeable batteries 256. Such a battery 256 provides electrical power to most, if not all electrical circuitry in mobile device 202, and battery interface 254 provides for a mechanical and electrical connection for it. The battery interface 254 is coupled to a regulator (not shown), which provides power V+ to all of the circuitry.

Mobile device 202 includes a microprocessor 238 (which is one implementation of controller 106 of FIG. 1), which controls overall operation of mobile device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications (such as a network reestablishment scheme), will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system thereby creating a mirrored host computer on mobile device 202 with respect to such items. This is especially advantageous where the host computer system is the mobile device user's office computer system. Additional applications may also be loaded onto mobile device 202 through the communications network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component which provides for communication between mobile device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Mobile device 102, 202 is capable of communicating with a public or private data network such as the Internet 130 via either a GPRS access part 117 of the wireless network 104 or a UMTS access part 120 of the network 104 dependent on which cell or cells it is located in. Only one of the access technologies is operated within the mobile device at any time.

Figure 3:
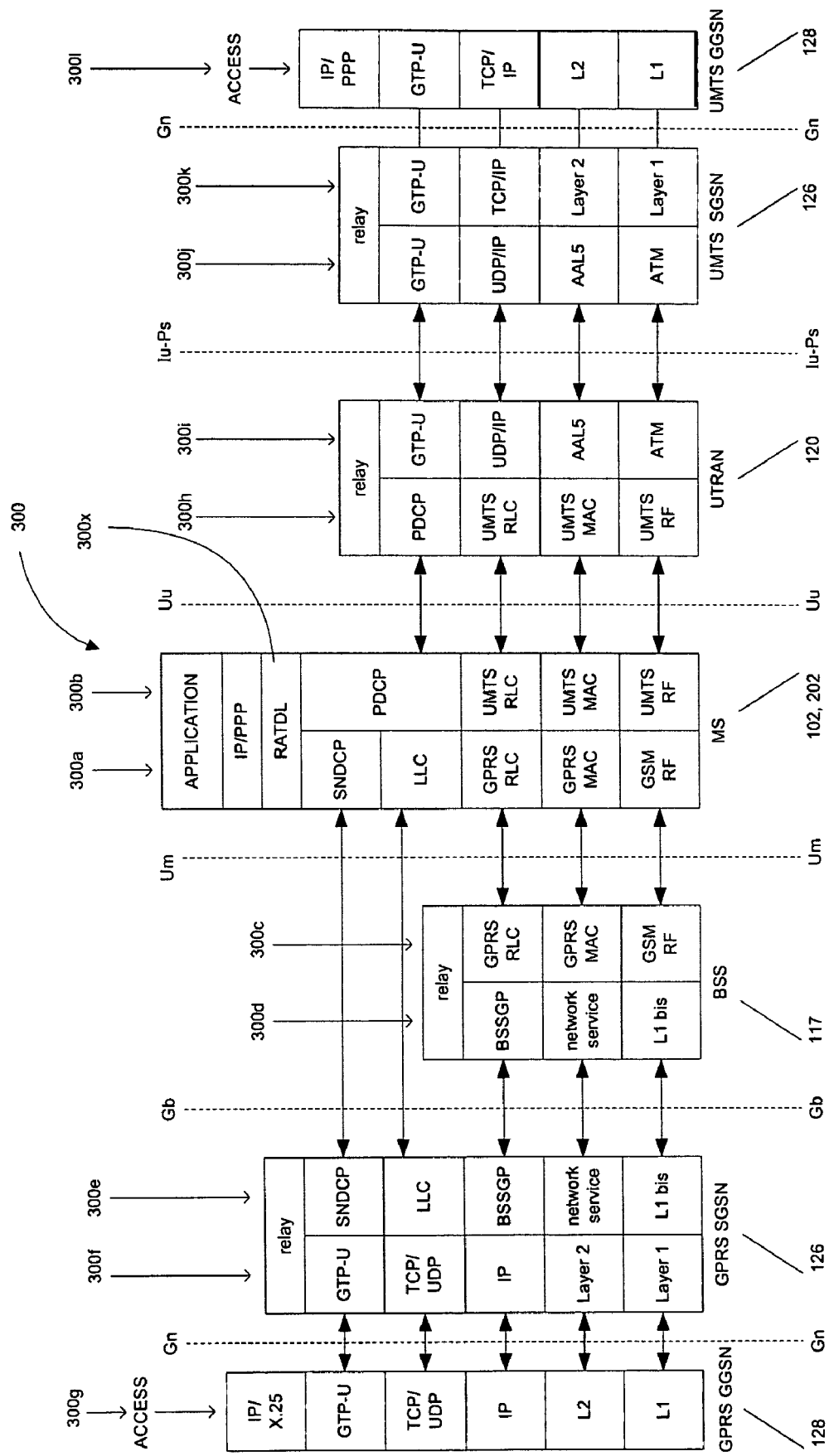
FIG. 3 is a protocol stack diagram for packet transmission in GSM/GPRS/UMTS wireless communications system.

FIG. 3 is a protocol stack diagram 300 illustrating the protocol stacks 300a-l implemented by components 102, 202, 117, 120, 126, 128 of the wireless network 104 for transferring data packets between the mobile device 102, 202 and a data network such as the Internet 130. The protocol stack diagram 300 comprises two halves, a first half 300a,c-g representative of a data path (arrowed line A in FIG. 1) formed through the GPRS access part of the wireless network 104 and a second half 300b,h-l representative of a data path (arrowed line B in FIG. 1) through a UMTS access part of the wireless network 104. The diagram illustrated in FIG. 3 will be familiar to a skilled artisan save for the "RATDL" (Radio Access Technology De-multiplexing Layer) which will be described in more detail below. The operation of the protocol stacks 300a-l save for the RADTL 300x is in accordance with the 3GPP specifications and need not be explained in detail here. The protocol stack diagram 300 also carries the interface designations for GPRS/UMTS which map onto those included in the system diagram of FIG. 1.

It will be appreciated that each of the components of the wireless network 104 have respective memory devices (M) and microprocessor devices (μP) for storing and executing program code for processing data packets in accordance with their respective protocol stacks 300a-l.

The following acronyms are utilised in the protocol stack diagram of FIG. 3:
GTP=GPRS Tunnelling Protocol
TCP=Transfer Control Protocol
UDP=User Datagram Protocol
IP=Internet Protocol
SNDCP=SubNetwork Dependent Convergent Protocol
LLC=Logical Link Control
BSSGP=Base Station Subsystem GPRS Protocol
RLC=Radio Link Control
MAC=Media Access Control
PDCP=Packet Data Convergence Protocol
ATM=Asynchronous Transfer Mode
AAL2/5=ATM Adaptation Layer 2/5

Figure 4:
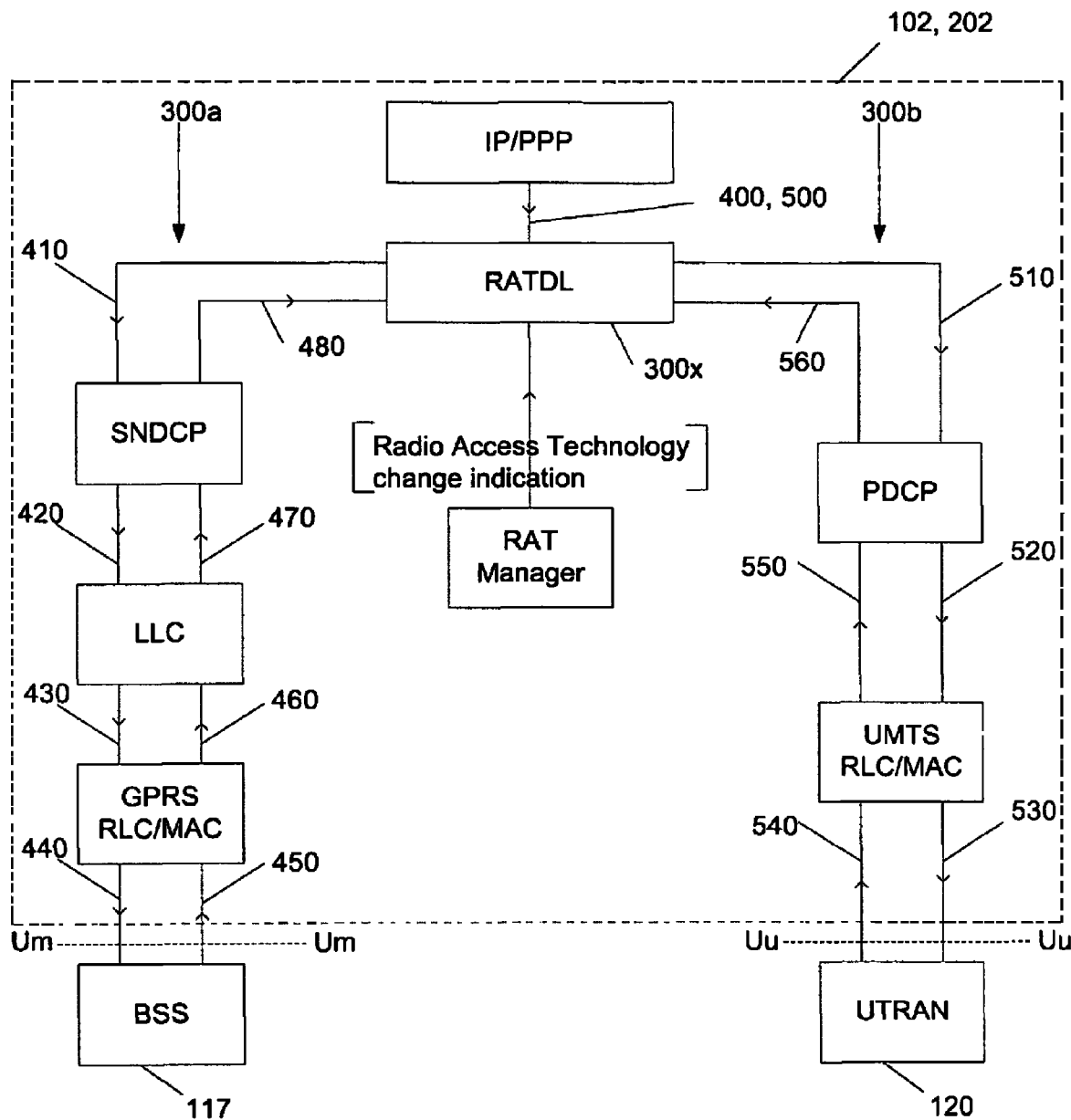
FIG. 4 is a diagram of that part of the protocol stack of FIG. 3 implemented by the mobile device of FIGS. 1 and 2.

Referring again to FIG. 3 and also to FIG. 4, the RATDL 300x comprises a protocol (software) layer added to the highest common point of the two protocol stacks 300a,b implemented separately by the mobile device 102, 202 for GPRS and UMTS. The RATDL 300x may comprise a separate protocol layer as illustrated or may be combined with the SNDCP layer of the mobile device protocol stack 300a for the GPRS data path and with the PDCP layer of the mobile device protocol stack 300b for the UMTS data path. The RATDL 300x may be embodied in a separate Radio Access Technology (RAT) module within the mobile device 102, 202 but, in a preferred arrangement, is implemented as software stored in the memory 224 of the device and executed by the processor 238 thereof.

The RAT module manages data packets (referred to herein as network Protocol Data Units (N-PDUs)) being transmitted by the mobile device through a selected one of the two possible wireless access technology paths respectively represented by the two protocol stacks 300a,b of the mobile device 102, 202 by receiving and buffering N-PDUs to be transmitted. The RAT module stores copies of transmitted N-PDUs in the RAM 226 or other memory component of the mobile device 202. Upon receipt from at least one lower layer in the currently active protocol stack of confirmation of successful transmission of a N-PDU by that layer to a lower layer, the RAT module removes the stored copy of that N-PDU from the RAM 226. However, in the event of a technology switch in the data path, the RAT module transfers any unsuccessfully transmitted N-PDUs to the transmit queue of the newly initiated active protocol stack, thereby eliminating or at least substantially reducing the likelihood of data packets being lost on the occurrence of a data path technology change.

The implementation of this process in the GPRS protocol stack 300a is described below with reference to FIG. 4. In a first step 400, where the RAT module has data (normally IP data packets) for transmission from the mobile device 102, 202 to the wireless network 104 through the BSS 117 or UTRAN 120, it processes each N-PDU in the RATDL layer 300x. At this layer, a copy of the N-PDU is stored prior to transmission. Also, the N-PDU is assigned an identifier PDU_ID. The identifier is preferably unique to that N-PDU and is stored in a memory component, e.g. RAM 226, of the mobile device. The identifier may comprise a number relating to a count of N-PDUs received, e.g. the Nth N-PDU is assigned the identifier "N" or its indexed position in a table or its address in memory.

In a next step 410, since (in this example) the current cell in which the mobile device is located is a GPRS cell, the N-PDU is transferred down the GPRS protocol stack 300a. This commences with the RATDL passing the N-PDU together with its identifier PDU_ID to the SNDCP layer. SNDCP may segment the PDU into a number of smaller packets (referred herein as SN_PDUs) and, as such, program code for implementing the SNDCP is arranged to maintain a relationship between the new smaller SN_PDUs and the PDU_ID in order that it can subsequently be determined whether the entire original N-PDU has been successfully transmitted by that layer to a lower layer. The correspondence between the number of SN_PDUs and the original N-PDU may be stored in a look-up table maintained in the mobile device RAM 226 by associating SNDCP identifiers (SN_PDU_IDs) with the PDU_ID.

In a next step 420, the SNDCP layer passes the SN_PDUs to the LLC layer along with their respective SN_PDU_IDs identifiers, which each uniquely identifies its respective SN_PDU, whilst maintaining a record of the correspondence between said SN_PDU_IDs and PDU_ID. It should be noted that if the SNDCP layer is operating in acknowledged mode, the mobile device does receive an acknowledgement from the network of successful transmission of a last received N-PDU on the occurrence of a technology path change. However, the SNDCP acknowledged mode is rarely used or even supported in mobile devices and networks. The present invention is particularly, but not exclusively, directed to use in the more common unacknowledged mode of operation of the SNDCP layer that does not require extra communication with the network thus avoiding latency issues.

In a next step 430, the LLC layer packetizes the SN_PDUs in a manner consistent with the 3GPP specifications, and transfers them to the RLC/MAC layer along with their unique SN_PDU_IDs.

At 440, the RLC/MAC layer, provided wireless interface conditions allow, transfers the packets it receives from the LLC layer over the wireless interface 150 to the network 104. If operating in an unacknowledged mode, meaning an acknowledgement of transfer of the packet to the network 104 is not expected from the network 104, then the process proceeds to step 460.

If, however, the RLC/MAC layer is operating in the acknowledged mode, it waits at step 450 for an acknowledgement from the network 104 of receipt of a transmitted packet in accordance with the mechanisms described in the 3GPP specifications. When the network 104 receives the packet it returns an acknowledgement to the RLC/MAC layer. This acknowledgement from the network does confirm successful transmission of N-PDUs. However, the current 3GPP specifications do not describe any method for transferring unacknowledged PDUs to a new access technology.

At step 460, the RLC/MAC layer returns to the LLC layer each of the SN_PDU_IDS as confirmation of successful transfer by the RLC/MAC layer of the SN_PDUs to the network 104.

At step 470, the LLC layer forwards each of the SN_PDU_IDs to the SNDCP layer as confirmation of transmission of the SN_PDU packets at the LLC layer.

Finally, at step 480, the SNDCP layer on receiving all of the SN_PDU_IDs corresponding to the PDU_ID of the original N-PDU, returns the PDU_ID to the RATDL as confirmation of successful transmission of the N-PDU by the lower layers of the GPRS protocol stack 300a. The RATDL then discards the stored copy of the original PDU as it has been successfully transferred.

The above process is repeated for each N-PDU being transmitted by the mobile device 102, 202 to the network 104 and continues until the packet connection is terminated or until a data path technology change is required as a result of the mobile device moving to a new cell, for example, thereby initiating a hand-off process.

In the event that the RATDL does not receive the PDU_ID from the SNDCP layer, it can be concluded that transmission by at least one lower layer of the GPRS protocol stack was unsuccessful. This mechanism is primarily intended to allow the RATDL to forward to the transmit queue of a newly initiated data path any stored N-PDU deemed not to have been successfully transferred by a lower protocol layer. However, it could also be employed as a retransmit packet (N-PDU) mechanism within a currently active data path whereby, if, after a predetermined time-out period the RADTL has not received the PDU_ID from the SNDCP layer, the RATDL retransmits the N-PDU and associates with it a new identifier.

When the RAT module (RATDL layer) receives an indication of a radio access technology (RAT) change, e.g. from GPRS to UMTS, the RATDL layer sends all N-PDUs that have not been confirmed as having been transmitted by the GPRS protocol stack 300a to the UMTS protocol stack 300b.

The implementation of the data packet transfer process through the UMTS protocol stack 300b is now described with reference to FIG. 4.

A first step 500 is identical to step 400 as hereinbefore described.

In a next step 510, since the current cell (for this example) in which the mobile device is located is a UMTS cell, the N-PDU is transferred down the UMTS protocol stack 300b. This commences with the RATDL passing the N-PDU together with its identifier PDU_ID to the PDCP layer.

In a next step 520, the PDCP layer in turn passes the N-PDU with its identifier to the (UMTS) RLC/MAC layer whereafter, at step 530, the RLC/MAC layer transmits the N-PDU to the network 104 if radio conditions permit. If the UMTS RLC/MAC layer is operating in either of the transparent mode or unacknowledged mode then the process proceeds to step 550.

If, however, the RLC/MAC layer is operating in the acknowledged mode, it waits at step 540 for an acknowledgement from the network 104 of receipt of a transmitted packet in accordance with the mechanisms described in the 3GPP specifications. When the network 104 receives the packet it returns an acknowledgement to the RLC/MAC layer.

At step 550, the RLC/MAC layer returns the PDU_ID to the PDCP layer as confirmation of successful transfer by that layer of the N-PDU.

Finally, at step 560, the PDCP layer on receiving the PDU_ID, returns the PDU_ID to the RATDL as confirmation of successful transmission of the N-PDU by the lower layers of the UMTS protocol stack 300b. The RATDL then discards the stored copy of the original PDU as it has been successfully transferred.

When the RATDL layer receives an indication of a radio access technology change from UMTS to GPRS, it sends all stored N-PDUs to the GPRS protocol stack 300a.

It will be understood that the data packet process in accordance with an implementation of the packet transfer process as performed in a preferred embodiment of a mobile device 102, 202 requires some of the functionality of the 3GPP specified protocol (software) layers of the protocol stacks 300a,b to be modified to implement the process such that said existing protocol layers are able to maintain an identifier associated with each N-PDU so that they may confirm to the layer above the successful transfer by that layer of the N-PDU to the layer below.

It will also be appreciated that the process of the present invention is non-trivial since, because the N-PDUs may be processed by protocol layers where they may be segmented, an association between the N-PDUs and their respective segments must be maintained in order to subsequently confirm successful transfer of said N-PDUs by such protocol layers.

Whilst the present invention has been described with respect to a mobile device adapted to operate in both a GSM/GPRS network and a UMTS network and to be switchable therebetween, it will be appreciated that the process of the invention and the means for putting it into effect in a mobile device could be implemented in a dual or multi-mode CDMA wireless environment, for example. Consequently, the foregoing description should not be taken as being limitative of the scope of the present invention.

The packet transfer process of the present invention increases packet volume throughput in a mobile device adapted to operate in a dual mode wireless access network and increases the integrity of the data packet transfer process in said mobile device.

In summary, the invention is directed to a process for transferring data packets through a protocol stack employed by the device for transmitting packets on a packet connection to a wireless network, said wireless network operating at least two, distinct wireless access technologies such as GSM/GPRS and UMTS. The packet transfer process generally comprises each layer of a protocol stack for a currently active packet connection path providing confirmation to a next, higher layer in the stack of successful reception of a data packet from that layer, thereby confirming successful transfer of the data packet through the stack. The first layer of the stack stores a copy of a transferred packet until such time as its receives confirmation from the next, lower layer of successful transfer of the packet of the stack. In the absence of such confirmation and on the occurrence of a switch (hand-off) of the packet connection to a new connection path, particularly one of a different wireless access technology, the stored packet is transferred to the protocol stack to be employed by the wireless device for the new packet connection path. Consequently, the packet transfer process avoids packets being lost on the occurrence of a switch between different technology wireless access packet connection paths.

What is claimed is:

1. A method of determining successful transmission of data packets through a protocol stack on a sending side of an air interface in a wireless device, the wireless device capable of being operated in accordance with two different radio access technologies (RATs) of a wireless network, comprising:

providing a first protocol stack for a first RAT and a second protocol stack for a second RAT, where each of said protocol stacks comprises layers applicable only to its respective RAT;

providing a RAT module usable at a same layer common to each of said protocol stacks;

said RAT Module storing a copy of a data packet and, prior to transmission of said data packet, assigning a unique identifier to said data packet;

sending said data packet together with the unique identifier from said RAT module to a lower layer of the first protocol stack, where the first protocol stack comprises a currently active connection path for data packet transmission;

receiving from a lower layer of the first protocol stack on the sending side of the air interface an indication, generated at the lower layer of the sending side of whether the data packet, assigned with the unique identifier, is successfully transmitted;

deleting said stored data packet copy if said RAT module receives an indication of said unique identifier from said lower layer, indicating successful transmission of the transferred data;

maintaining the stored data packet if said RAT module does not receive an indication of said unique identifier from said lower layer, indicating unsuccessful transmission of the transferred data packet;

when unsuccessful transmission is indicated, using said stored copy of the data packet to retransmit the data packet from said RAT module to said lower layer; and when unsuccessful transmission is indicated and when said RAT module detects an indication of a change so that the second protocol stack comprises a currently active connection path for data packet transmission, using said stored copy to send said data packet from said RAT module to a lower layer of the second protocol stack.

2. The method of claim 1, wherein the RAT module transfers said unique identifier associated with said data packet to the lower layer and wherein said lower layer returns the unique identifier to the RAT module as the indication that the data packet has been transmitted.

3. The method of claim 1, comprising a lower layer of the protocol stack comprising the currently active connection path for data packet transmission segmenting the data packet received from a next, higher layer of the stack to provide smaller packets for transferring to a next, lower layer of the stack and maintaining a correspondence between the smaller packets and the data packet from which they were segmented.

4. The method of claim 3, wherein the lower layer of the stack associates an identifier with each of the smaller packets, wherein subsequent receipt by said layer from the next, lower layer of all of the smaller packets identifiers confirms successful transmission of all of said smaller packets and triggers said lower layer to return to the next, higher layer the unique identifier associated with the original data packet.

5. The method of claim 1 wherein the first RAT is one of GPRS and UMTS and the second RAT is the other of GPRS and UMTS.

6. The method of claim 1 comprising:
re-sending, after detecting an indication of an expiration of a predetermined time-out period associated with said stored data packet, said data packet to the lower level of the first protocol stack if the first protocol stack is currently the active connection path for data packet transmission.

7. A wireless device configurable to be operable in a wireless network and configurable to be operable with two different radio access technologies (RATs) comprising:
a memory for storing a copy of a data packet;
a processor enabled to execute software stored on the wireless device such that the processor, when executing the software, comprises:
a first protocol stack for a first RAT and a second protocol stack for a second RAT, where each of said protocol stacks comprises layers applicable only to its respective RAT;
a RAT module usable at a same layer common to each of said protocol stacks;
the RAT module comprising a plurality of functions, including being configured to store a copy of a data packet in said memory, to assign a unique identifier to said data packet prior to transmission of said data packet; to send said data packet together with the unique identifier to a lower layer of the first protocol stack where the first protocol stack comprises a currently active connection path for data packet transmission, to receive from a lower layer of the first protocol stack an indication, generated at the lower layer, of whether the data packet, assigned with the unique identifier, is successfully transmitted, to delete said stored data packet copy if said RAT module receives an indication of said unique identifier from said lower layer indicating successful transmission of transferred data, to maintain the stored data packet if said RAT module does not receive an indication of said unique identifier from said lower layer, indicating unsuccessful transmission of the transferred data packet, when unsuccessful transmission is indicated, using said stored copy of the data packet to retransmit the data packet, from said RAT module to said lower layer, and when unsuccessful transmission is indicated and when said RAT module detects an indication of a change so that the second protocol stack comprises a currently active connection path for data packet transmission to use said maintained stored data packet copy of the data packet determined to be unsuccessfully transferred to send said data packet from said RAT module to a lower layer of the second protocol stack.

8. The device of claim 7, wherein the processor is arranged to transfer said unique identifier to said lower layer and arranged to receive the unique identifier from the lower layer to thereby confirm successful transmission of the data packet.

9. The device of claim 8, wherein the processor is arranged to assign an ID to said stored packet.

10. The device of claim 9, wherein the processor is arranged to return from each layer of the protocol stack the unique identifier associated with the data packet to the next, higher layer in the stack whereby receipt of the unique identifier by the RAT module confirms successful transmission of the data packet.

11. The device of claim 7, wherein the processor is arranged to segment the data packet at a layer lower than the RAT module of the protocol stack comprising the currently active connection path for data packet transmission and to maintain a correspondence between the segments that comprise the data packet and the data packet.

12. The device of claim 11, wherein the processor is arranged to maintain the association between the segments of a data packet using an identifier for each of the segments, wherein subsequent receipt by said layer from the next, lower layer of all of the segment identifiers that comprise the data packet confirms successful transmission of all of said data packet and triggers said processor to return to the next, higher layer the unique identifier associated with the original data packet.

13. The device of claim 7 where the first RAT is one of GPRS and UMTS and the second RAT is the other of CPRS and UMTS.

14. The device of claim 7, wherein the device comprises a mobile wireless communications device.

15. The device of claim 7 where the processor, when executing the software, comprises:
re-sending, after detecting an indication of an expiration of a predetermined time-out period associated with said stored data packet, said data packet to the lower level of the first protocol stack if the first protocol stack is currently the active connection path for data packet transmission.

16. A non-transitory computer readable medium for a wireless device embedded with a computer executable program including instructions for determining successful transmission of data packets where the wireless device is configurable to operate in a wireless network and operable in accordance with two radio access technologies (RATs) of the wireless network, the instructions when executed comprising:

provide a first protocol stack for a first RAT and a second protocol stack for a second RAT, where each of said protocol stacks comprises layers applicable only to its respective RAT;

providing a RAT module usable at a same layer common to each of said protocol stacks;

said RAT Module storing a copy of a data packet and, prior to transmission of said data packet, assigning a unique identifier to said data packet;

sending said data packet together with the unique identifier from said RAT module to a lower layer of the first protocol stack, where the first protocol stack comprises a currently active connection path for data packet transmission;

receiving from a lower layer of the first protocol stack an indication, generated at the lower layer, of whether the data packet, assigned with the unique identifier, is successfully transmitted;

deleting said stored data packet copy if said RAT module receives an indication of said unique identifier from said lower layer indicating successful transmission of the transferred data;

maintaining the stored data packet if said RAT module does not receive an indication of said unique identifier from said lower layer, indicating unsuccessful transmission of the transferred data packet; and when unsuccessful transmission is indicated, using said stored copy of the data packet to retransmit the data packet, from said RAT module to said lower layer; and when unsuccessful transmission is indicated and when said RAT module detects an indication of a change so that the second protocol stack comprises a currently active connection path for data packet transmission, using said maintained stored copy determined to be unsuccessfully transferred to send said data packet from said RAT module to a lower layer of the second protocol stack.

17. The non-transitory computer readable medium of claim 16 comprising:

re-sending, after detecting an indication of an expiration of a predetermined time-out period associated with said stored data packet, said data packet to the lower level of the first protocol stack if the first protocol stack is currently the active connection path for data packet transmission.

18. A system configurable to he usable in a wireless network and configurable to be usable with two radio access technologies (RATs), the system comprising:

a memory for storing a copy of a data packet;

a processor enabled to execute software stored on the system such that the processor, when executing the software, comprises:

a first protocol stack for a first RAT and a second protocol stack for a second RAT, where each of said protocol stacks comprises layers applicable only to its respective RAT;

a RAT module usable at a same layer common to each of said protocol stacks;

the RAT module comprising a plurality of functions, including being configured to store a copy of a data packet in said memory, to assign a unique identifier to said data packet prior to transmission of said data packet; to send said data packet together with the unique identifier to a lower layer of the first protocol stack where the first protocol stack comprises a currently active connection path for data packet transmission, to receive from a lower layer of the first protocol stack an indication, generated at the lower layer, of whether the data packet, assigned with the unique identifier, is successfully transmitted, to delete said stored data packet copy if said RAT module receives an indication of said unique identifier from said lower layer indicating successful transmission of transferred data, to maintain the stored data packet if said RAT module does not receive an indication of said unique identifier from said lower layer indicating unsuccessful transmission of the transferred data packet, and when unsuccessful transmission is indicated, using said stored copy of the data packet to retransmit the data packet from said RAT module to said lower layer; and when unsuccessful transmission is indicated and when said RAT module detects an indication of a change so that the second protocol stack comprises a currently active connection path for data packet transmission to use said maintained stored data packet copy of the data packet determined to be unsuccessfully transferred to send said data packet from said RAT module to a lower layer of the second protocol stack.

* * * * *